(12) United States Patent
Barbee

(10) Patent No.: US 12,421,042 B2
(45) Date of Patent: Sep. 23, 2025

(54) TRANSFERRING ITEMS BETWEEN TWO SUPPORT SURFACES

(71) Applicant: ProPick IP LLC, Wylie, TX (US)

(72) Inventor: Samuel C. Barbee, Garland, TX (US)

(73) Assignee: ProPick IP LLC, Wylie, TX (US)

( * ) Notice: Subject to any disclaimer, the term of this patent is extended or adjusted under 35 U.S.C. 154(b) by 0 days.

(21) Appl. No.: 19/079,892

(22) Filed: Mar. 14, 2025

(65) Prior Publication Data

US 2025/0206536 A1    Jun. 26, 2025

Related U.S. Application Data

(63) Continuation of application No. PCT/US2023/033725, filed on Sep. 26, 2023, which is a continuation-in-part of application No. 18/200,940, filed on May 23, 2023.

(60) Provisional application No. 63/410,072, filed on Sep. 26, 2022.

(51) Int. Cl.
  *G06F 7/00* (2006.01)
  *B65G 1/137* (2006.01)

(52) U.S. Cl.
  CPC .................. *B65G 1/1373* (2013.01)

(58) Field of Classification Search
  CPC ........ B65G 1/1373; B65G 1/00; B65G 57/00; B65G 59/00; B65G 60/00; B65G 61/00; B65G 2203/00; B65G 2209/00
  USPC ......................................... 700/213–217, 228
  See application file for complete search history.

(56) References Cited

U.S. PATENT DOCUMENTS

| | | |
|---|---|---|
| 3,945,674 A | 3/1976 | Ide |
| 2009/0297324 A1 | 12/2009 | Jaeger |
| 2015/0175362 A1 | 6/2015 | Saito |
| 2018/0057283 A1* | 3/2018 | Peters ..................... B25J 5/007 |
| 2018/0096299 A1* | 4/2018 | Jarvis .................. G01C 21/206 |
| 2024/0101350 A1 | 3/2024 | Barbee |

OTHER PUBLICATIONS

ISA, International Search Report and Written Opinion issued in Application No. PCT/US2023/033725 on Jan. 3, 2024, 9 pages.

* cited by examiner

*Primary Examiner* — Yolanda R Cumbess
(74) *Attorney, Agent, or Firm* — Henry Patent Law Firm PLLC

(57) ABSTRACT

In a general aspect, a robotic system is disclosed for transferring items between two support surfaces, for example, from a storage surface to a pallet for transport. The robotic system includes a base that contacts a ground surface and includes a pallet handling unit. A vertical frame is supported by the base and includes four vertical beams that each extend from the base. Moreover, a gantry is supported by the vertical frame and includes a gantry frame that is movably coupled to the four vertical beams. The gantry is configured to translate an extendable arm horizontally along the gantry frame in a first direction between a storage region and a picking region. The extendable arm includes a gripping mechanism and is configured to extend and retract horizontally in a second direction between an extended position and a retracted position. The second direction is perpendicular to the first direction.

20 Claims, 16 Drawing Sheets

TRANSFERRING ITEMS BETWEEN TWO SUPPORT SURFACES

CROSS-REFERENCE TO RELATED APPLICATIONS

This application is a continuation of PCT App. No. PCT/US2023/033725, filed Sep. 26, 2023 and entitled "Transferring Items Between Two Support Surfaces", which claims priority to U.S. Prov. App. No. 63/410,072, filed Sep. 26, 2022 and entitled "Automated Order Collection System and Method of Use". PCT/US2023/033725 is a continuation-in-part of U.S. application Ser. No. 18/200,940, filed May 23, 2023 and entitled "Automated Order Collection System and Method of Use". The disclosures of these priority applications are hereby incorporated herein by reference in their entirety.

This application is a continuation-in-part of U.S. application Ser. No. 18/200,940, filed May 23, 2023 and entitled "Automated Order Collection System and Method of Use".

BACKGROUND

The following description relates to transferring items between support surfaces, for example, from a storage area onto a pallet for transport.

Storage facilities, such as warehouses, may be used to store items for later use. The storage facilities may include shelves or bins where the items are stored, and when the items are needed, the items may be retrieved from their storage locations. Such retrieval is often done by human labor, which may also be used to package multiple items together for transport to a location outside of the storage facility.

DESCRIPTION OF DRAWINGS

FIG. 2I is a schematic diagram, in left side view, of the example robotic system of FIG. 2A, but in which a gantry of the example robotic operating system is in a lowered vertical position;

DETAILED DESCRIPTION

In a general aspect, a robotic system is described for transferring items (e.g., products, cases of products, objects, etc.) between two support surfaces (e.g., from one support surface to the other). In some implementations, the robotic system transfers items from a storage surface (e.g., from a shelf or a bin) to a target surface on a pallet. More generally, the robotic system can transfer items between two surfaces. The items may be stored in a storage facility, such as a warehouse, and the two support surfaces may correspond to the support surfaces of a pallet, a shelf, or another type of support surface (e.g., a support surface of a base of the robotic system). In some implementations, the two support surfaces include first and second support surfaces. In these implementations, the first support surface may be the support surface provided by a pallet or shelf in the storage facility, and the second support surface may be the support surface of a pallet held by the robotic system. In some implementations, the robotic system may correspond to an order fulfillment device that is part of an automated order collection system for the storage facility.

Figure 1:
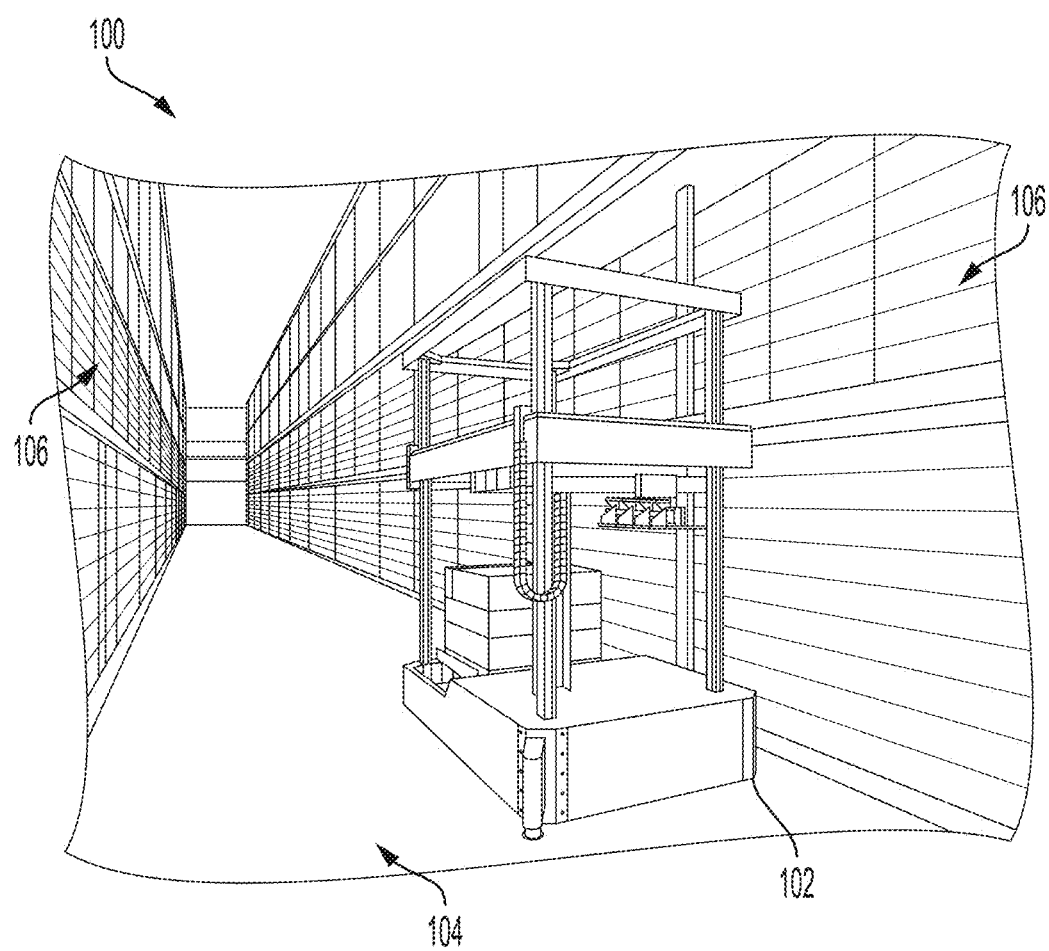
FIG. 1 is a schematic diagram of an example storage facility showing a robotic system operating therein.

FIG. 1 presents an example storage facility 100 showing an example robotic system 102 operating therein. The example storage facility 100 may include aisles 104 that separate adjacent rows 106 of stacked shelving units. The stacked shelving units may each have multiple shelves that define respective support surfaces. The support surfaces may be used to support items for long term storage. In some cases, the items may be directly disposed on a shelf, or alternatively, indirectly disposed on a shelf (e.g., through a pallet). In the latter case, the pallet may include a pallet support surface for supporting the items, and the support surface of the shelf, in turn, supports the pallet.

During operation, the robotic system 102 may traverse the aisles 104 to reach a target location in the example storage facility 100 where target items can be accessed by the robotic system 102. To facilitate such access, the robotic system 102 may include a gantry and one or more extendable arms that are supported by the gantry. The gantry may translate vertically to a first height, and one of the extendable arms may translate to a first horizontal position along the gantry and then extend to a first length to access the target item. A gripping mechanism on the extendable arm may allow the robotic system 102 to retrieve the target item from a stacked shelving unit and place it on a support surface of the robotic system 102.

For example, while holding the target item, the extendable arm may retract to a second, shorter length and then translate along the gantry to a second horizontal position, such as above the support surface of the robotic system 102. The gantry may also translate vertically to a second, lower height, after which, the gripping mechanism may release the target item onto the support surface of the robotic system 102. In some implementations, such as shown in FIG. 1, the support surface of the robotic system 102 is defined by a pallet support surface of a pallet. The pallet may be a portable platform on which goods can be stacked and stored, and some variations, have a configuration that is defined by a standard (e.g., ISO Standard 6780:2003, the U.S. Grocery Manufacturers Association standard, the EUR-pallet standard, etc.). The pallet can be moved, for example, by a forklift, by the robotic system 102, or by another type of transport vehicle. In FIG. 1, the pallet is held by a base of the robotic system. After the robotic system 102 has completed this "pick and place" process, the robotic system 102 may proceed to a second target location in the example storage facility 100 (e.g., to repeat the "pick and place" process with another target item, to eject the pallet from its base, etc.).

In many implementations, the robotic system 102 is a mobile robotic system that is configured for picking items off shelves or pallets and then storing (e.g., stacking) the picked items onto a pallet or a container on board the mobile robotic system. In these implementations, the robotic system 102 may be operable to directly fulfill orders from single-item pallets to mixed-item pallets without the need for additional shuttling or conveying equipment. As such, the core infrastructure of the example storage facility 100 can remain the same as that used by human labor. In some variations, the robotic system 102 includes a Cartesian-based gantry system that resides atop a mobile base. The gantry system allows for configurations of the robotic system 102 that have easier access around stacked shelving units and their racks. The configurations also allow for a higher payload in a footprint of the robotic system 102 as well as a larger work area compared to using a conventional 6-axis robotic arm. In some variations, the robotic system 102 includes one or more cameras that serve as part of a 3D vision system of the robotic system 102. The 3D vision system may allow the robotic system 102 to locate items on shelves and pallets. Other functionality is possible (e.g., identify a specific pallet from multiple pallets in a stacked shelving unit, confirm a location of a target item after placement on a support surface, etc.).

In some implementations, the robotic system 102 is a fully autonomous solution for case level order picking. The robotic system 102 may be configured to pick and palletize orders as it moves through the aisles 104 of the example storage facility 100, without the need to travel to a centralized picking station. Moreover, in some variations, the robotic system 102 is configured to stretch wrap finished pallets while held to a based of the robotic system. The finished and wrapped pallets may then be transported by the robotic system 102 to a dock for loading. In these implementations, the robotic system 102 may be able to build superior pallets while being faster and more efficient than manual operations conducted by human workers.

In some implementations, the robotic system 102 is part of an automated order collection system that includes one or more software components. In these implementations, the automated order collection system may include a global robot controller server that receives an order from a storage facility order system. The global robot controller server computes optimal parameters for the example storage facility 100 that are based on, for example, the number of pallets in the example storage facility 100 and the position and content of cases on each pallet. The optimal parameters may include an optimal number of pallets for the example storage facility 100, an optimal placement of products on a pallet to produce a stable pallet configuration, and an optimal driving pathway to build a pallet with products. Other optimal parameters are possible.

The global robot controller server then generates a "pick-list", which is subsequently dispatched to the robotic system 102 to build the computed pallets. If the automated order collection system includes a fleet of such systems, the global robot controller server may generate a unique "pick-list" for each robotic system 102. Once the robotic system 102 receives its "pick-list", it will travel in the aisles 104 of example storage facility 100 to the various pick locations on the "pick-list". Once at a specific pick location, the robotic system 102 may use a 3D vision system to scan the pallet(s) at the pick location and determine the position of the next available case. The robotic system 102 may then use the resulting vision data to pick up the case and place it in the calculated position on the pallet. The robotic system 102 can, for example, repeat this "pick and place" process until it has built a full pallet (e.g., of mixed goods). Once a pallet is complete, the robotic system 102 may drop the pallet off in a specified location, such as for loading onto a truck or on a shrink wrap machine in the loading area.

The robotic system 102 may provide advantages over conventional "pick and place" solutions for storage facilities. Conventional solutions may rely fully on human labor, or alternatively, on an automated storage and retrieval system (AS/RS) that requires a complete restructure of a warehouse and prevents human labor from using the AS/RS system to meet peak demand. Such solutions typically have "all-or-nothing" configurations that preclude one solution from supplementing the other. In contrast, the robotic system 102 may be installed into a storage facility without the expense and downtime associated with rearranging pallet locations, relocating inventory, or retraining human workers. As such, the deployment time of the robotic system 102 may, in many cases, be much shorter than conventional solutions (e.g., days versus months). The robotic system 102 may also be configured for "pallet-to-pallet" operation that eliminates the need for long lengths of conveyors (e.g., kilometer or mile lengths). This configuration can reduce order fulfillment costs while still allowing for "lights-out" fulfillment. The robotic system 102 may additionally be configured to include advanced safety sensors that allow the robotic system 102 to safely work alongside human workers.

The automated order collection system may also provide advantages for storage facilities. For example, the automated order collection system may be used to assist human workers in the manual picking of products, thereby optimizing the placement of cases on pallets. The human workers may thus work alongside instances of the robotic system 102 (e.g., alongside a fleet of such systems) to efficiently fulfill orders. Moreover, the global robot controller server may instruct the robotic system 102 to build spatially optimized pallets that have high packing densities and stability. Furthermore, the 3D vision system of the robotic system 102 may allow the robotic system 102 to pick target items from a disorganized or messy pallet and place the picked items with a high positional accuracy (e.g., no greater than ±5 mm). In some variations, the automated order collection system may be in communication with a robot operations center that continuously monitors all systems to ensure continuous uptime and operating efficiency.

Figure 2A:
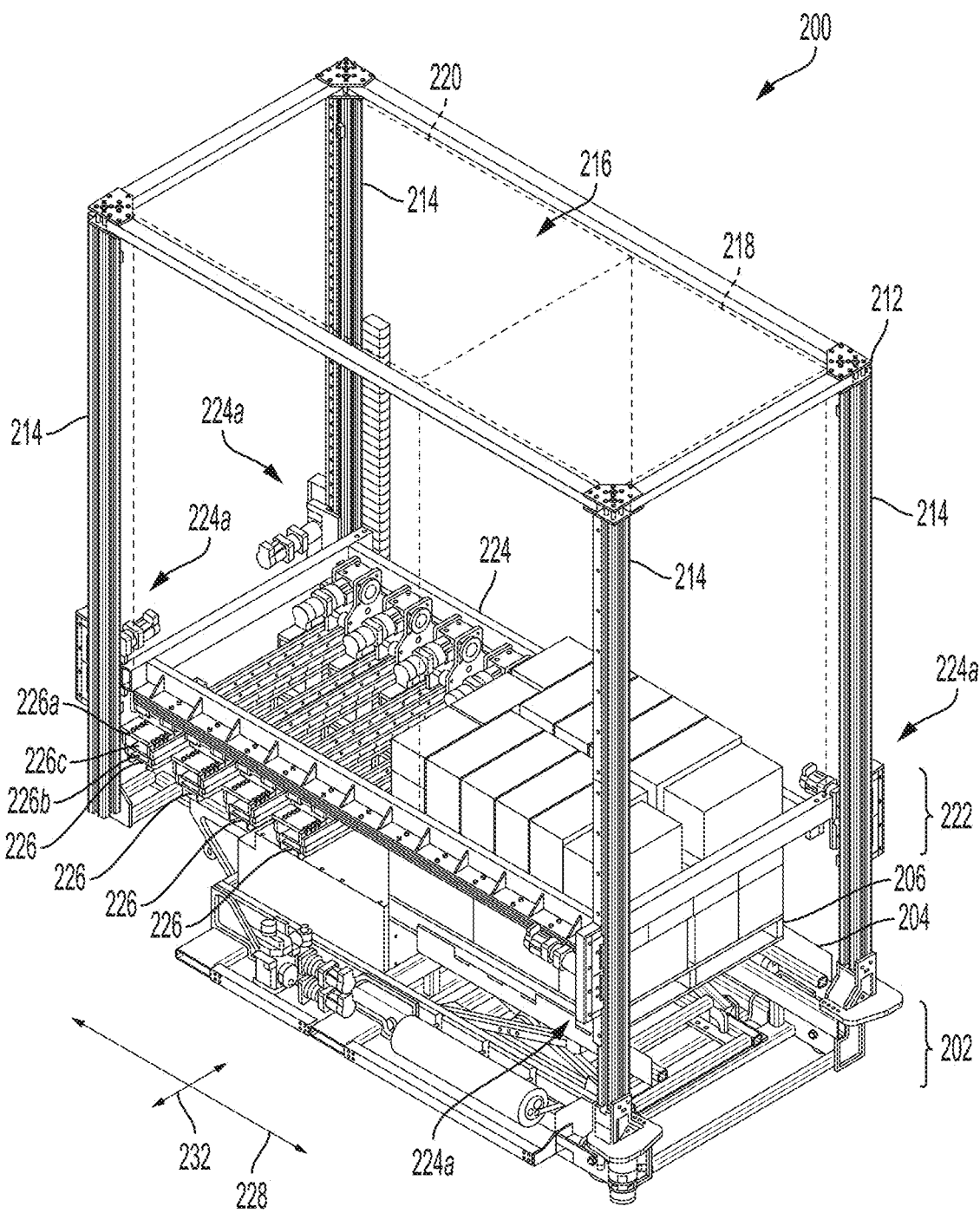
FIG. 2A is a schematic diagram, in top right perspective view, of an example robotic system.
Figure 2B:
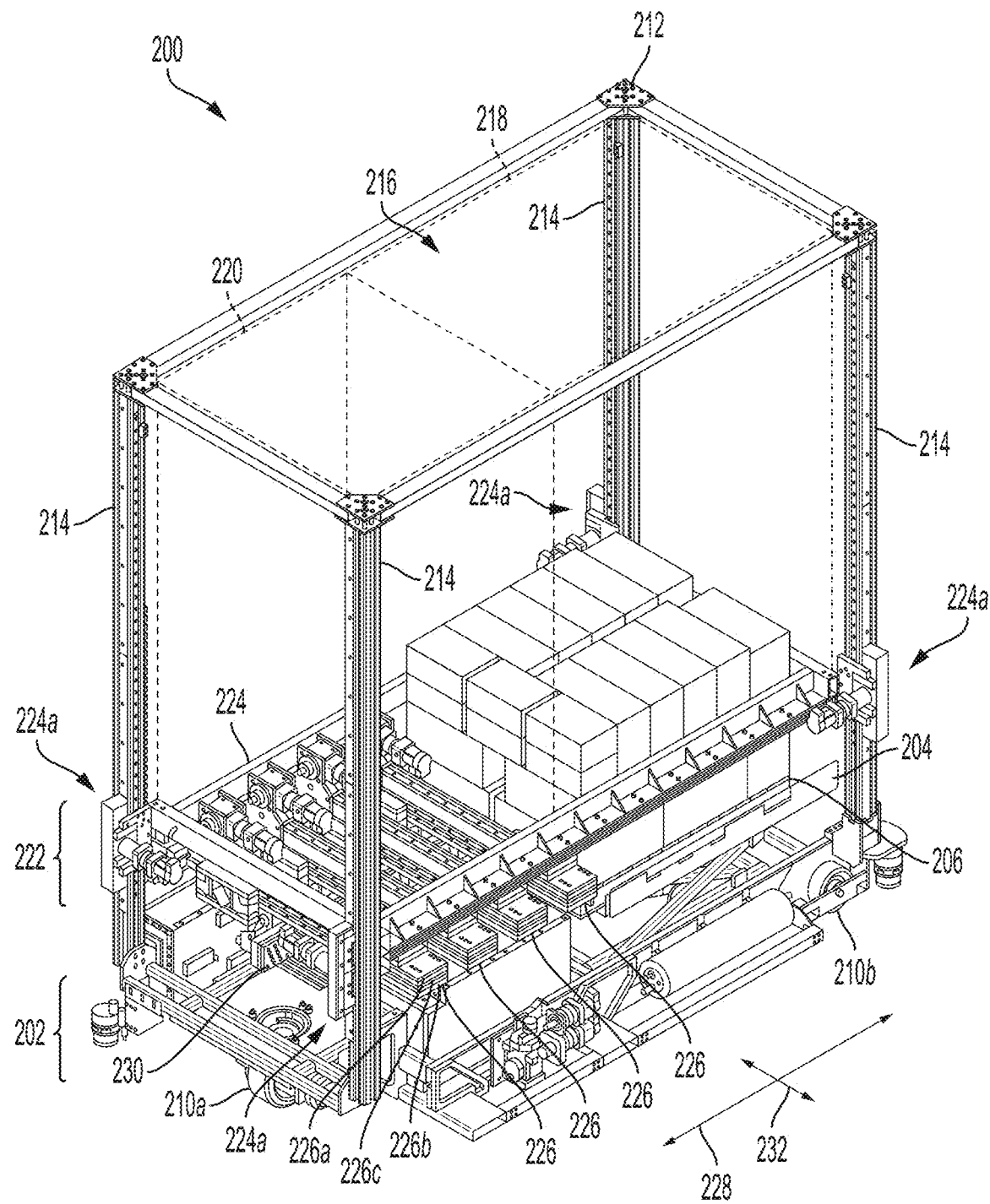
FIG. 2B is a schematic diagram, in top left perspective view, of the example robotic system of FIG. 2A.
Figure 2C:
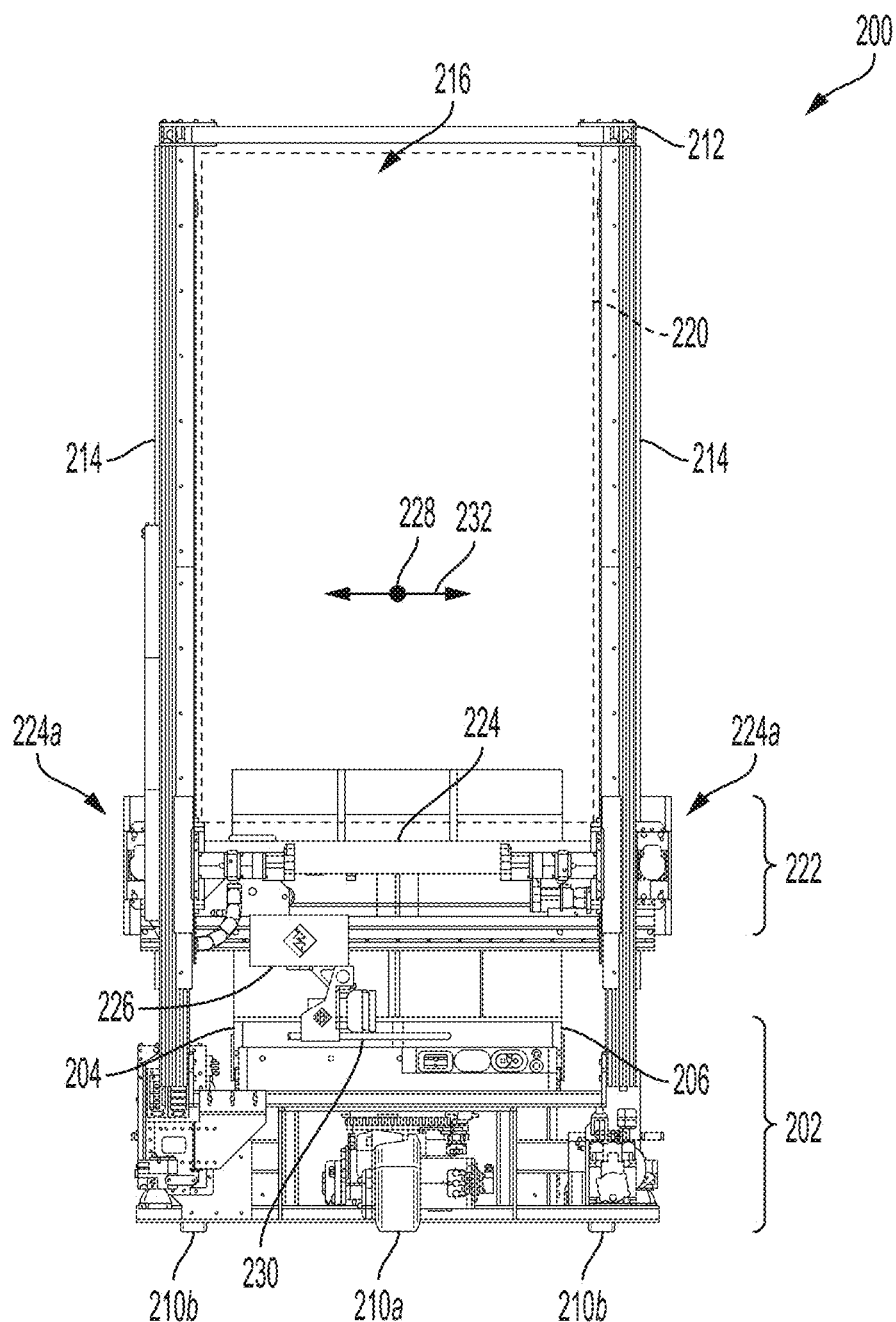
FIG. 2C is a schematic diagram, in front side view, of the example robotic system of FIG. 2A.
Figure 2D:
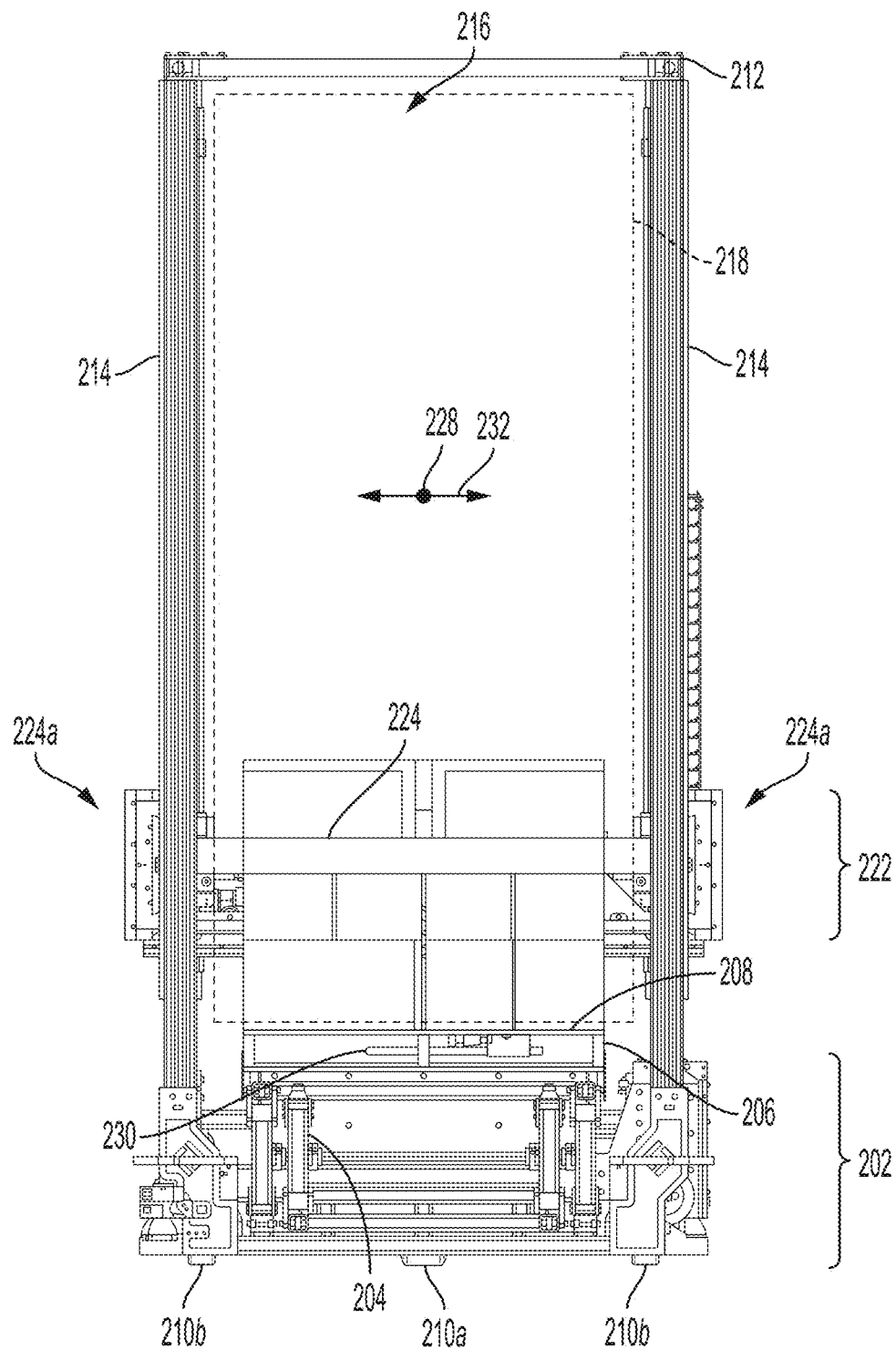
FIG. 2D is a schematic diagram, in rear side view, of the example robotic system of FIG. 2A.
Figure 2E:
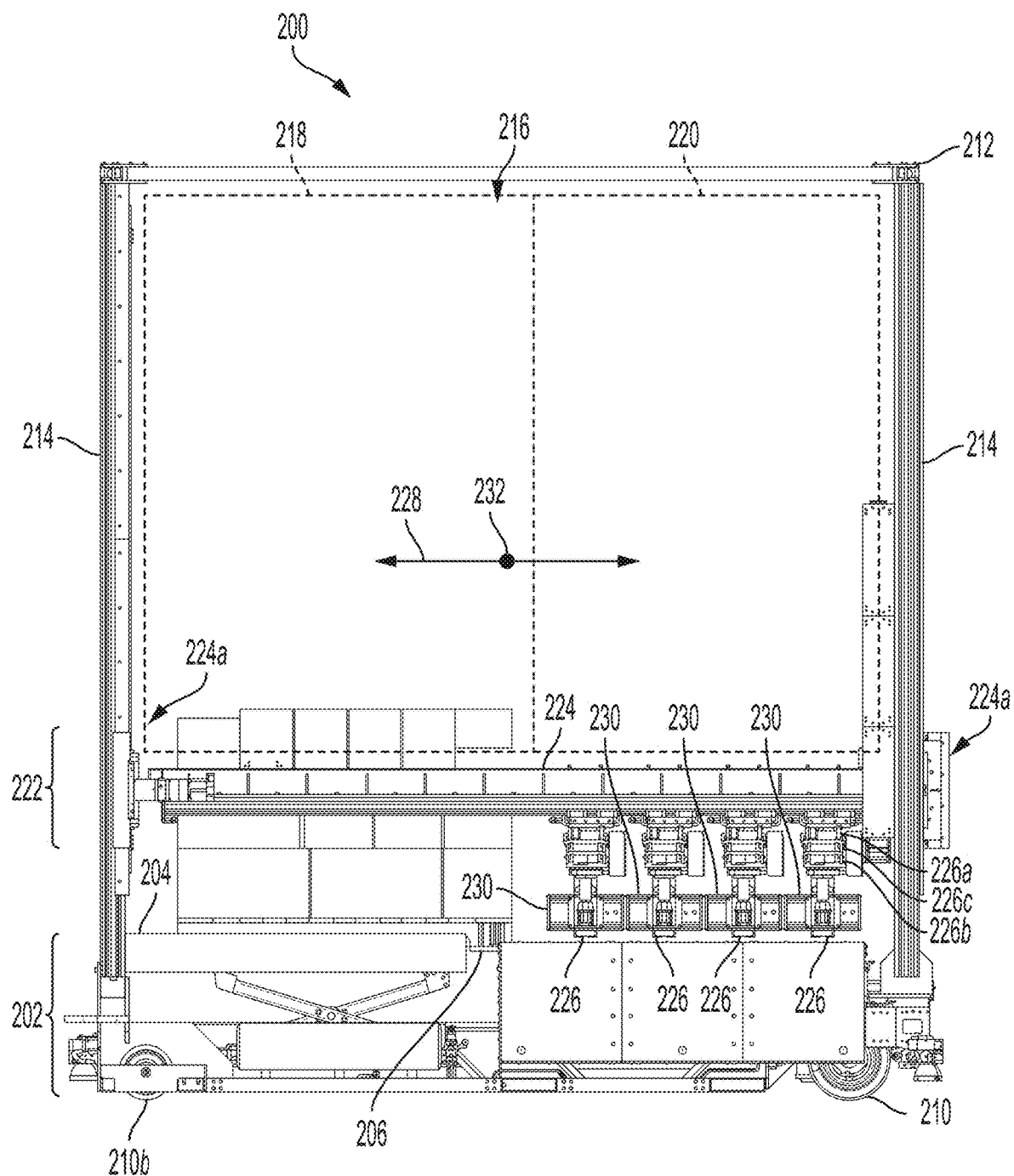
FIG. 2E is a schematic diagram, in left side view, of the example robotic system of FIG. 2A.
Figure 2F:
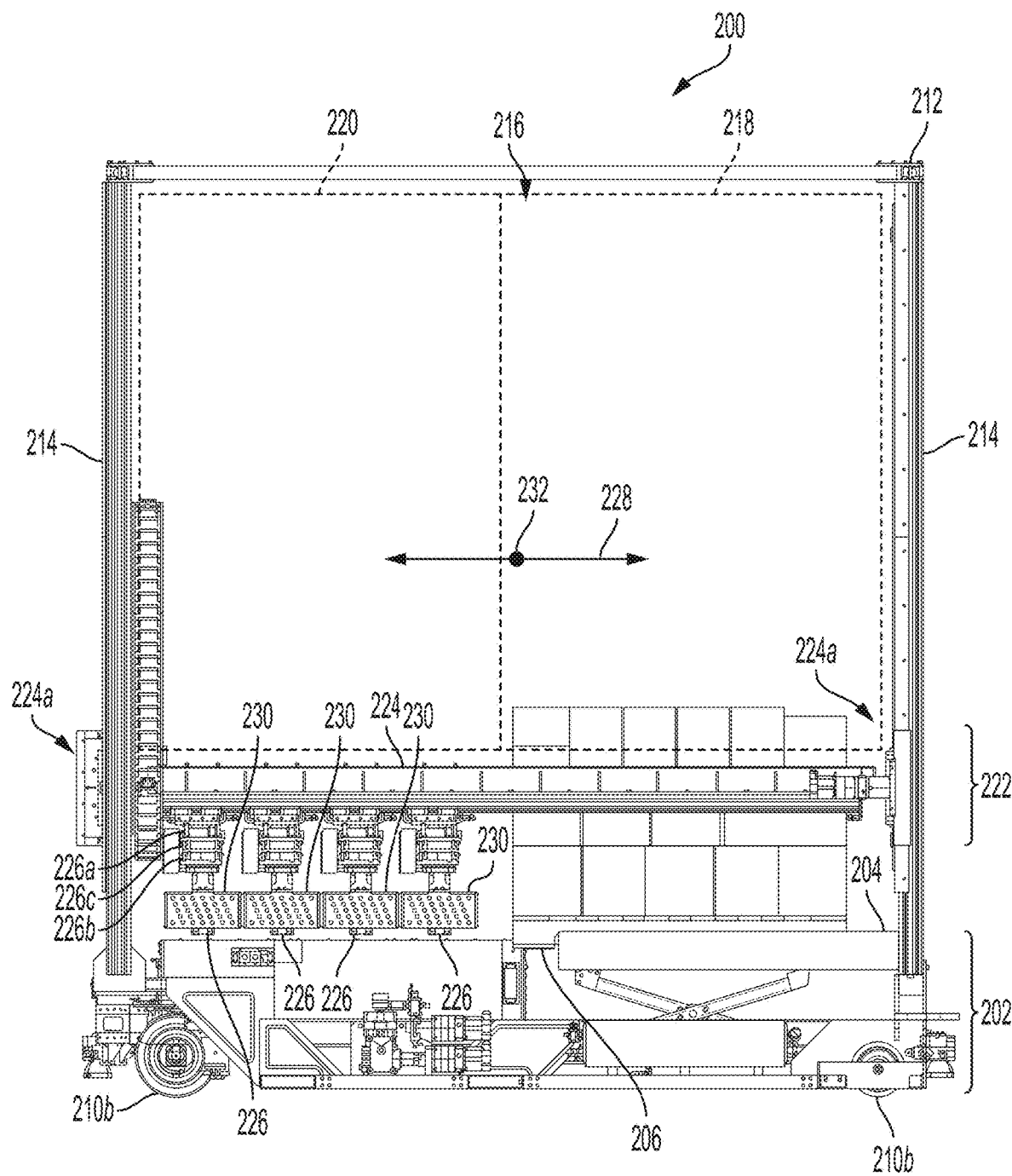
FIG. 2F is a schematic diagram, in right side view, of the example robotic system of FIG. 2A.
Figure 2G:
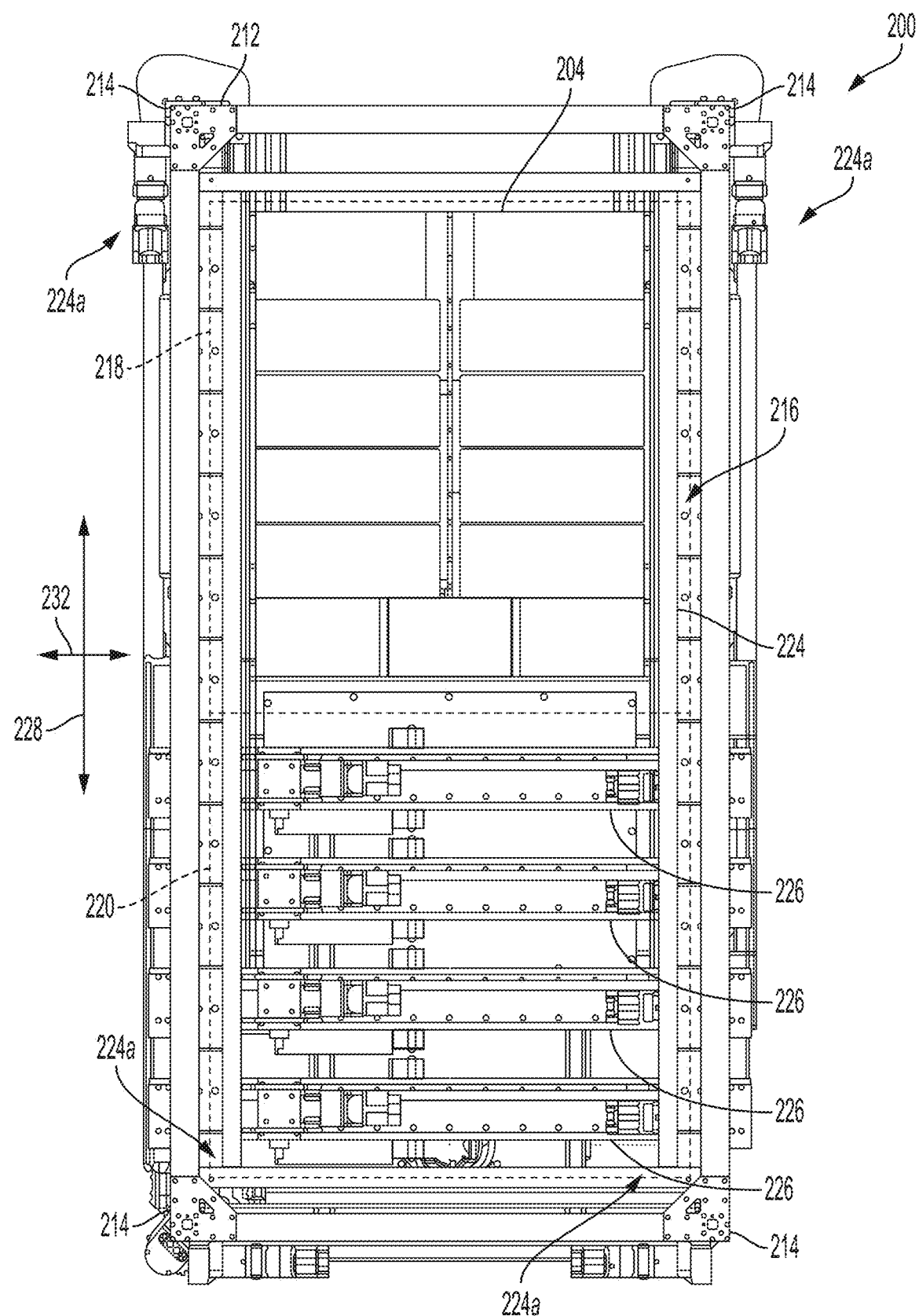
FIG. 2G is a schematic diagram, in top view, of the example robotic system of FIG. 2A.
Figure 2H:
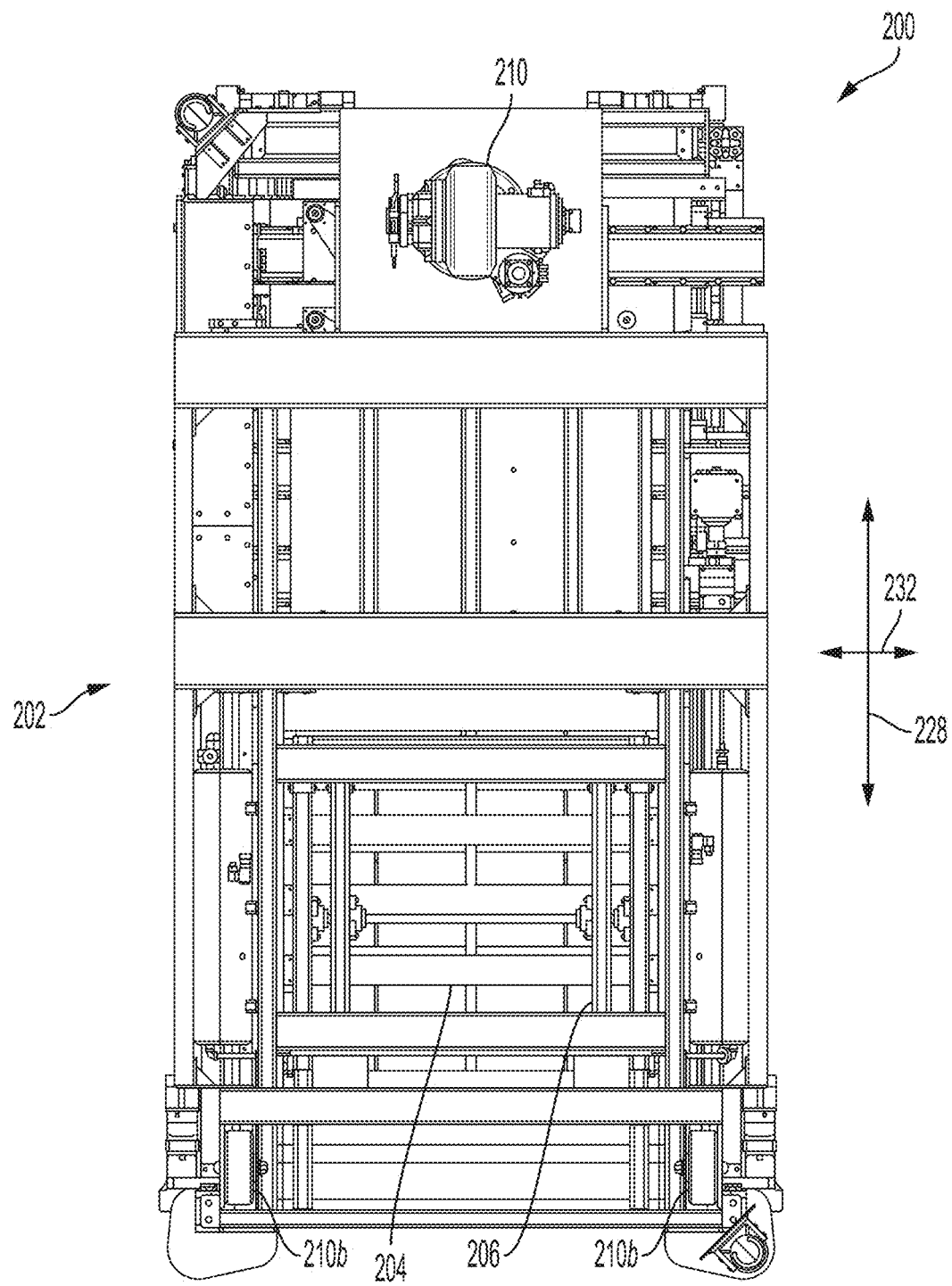
FIG. 2H is a schematic diagram, in bottom view, of the example robotic system of FIG. 2A.
Figure 21:
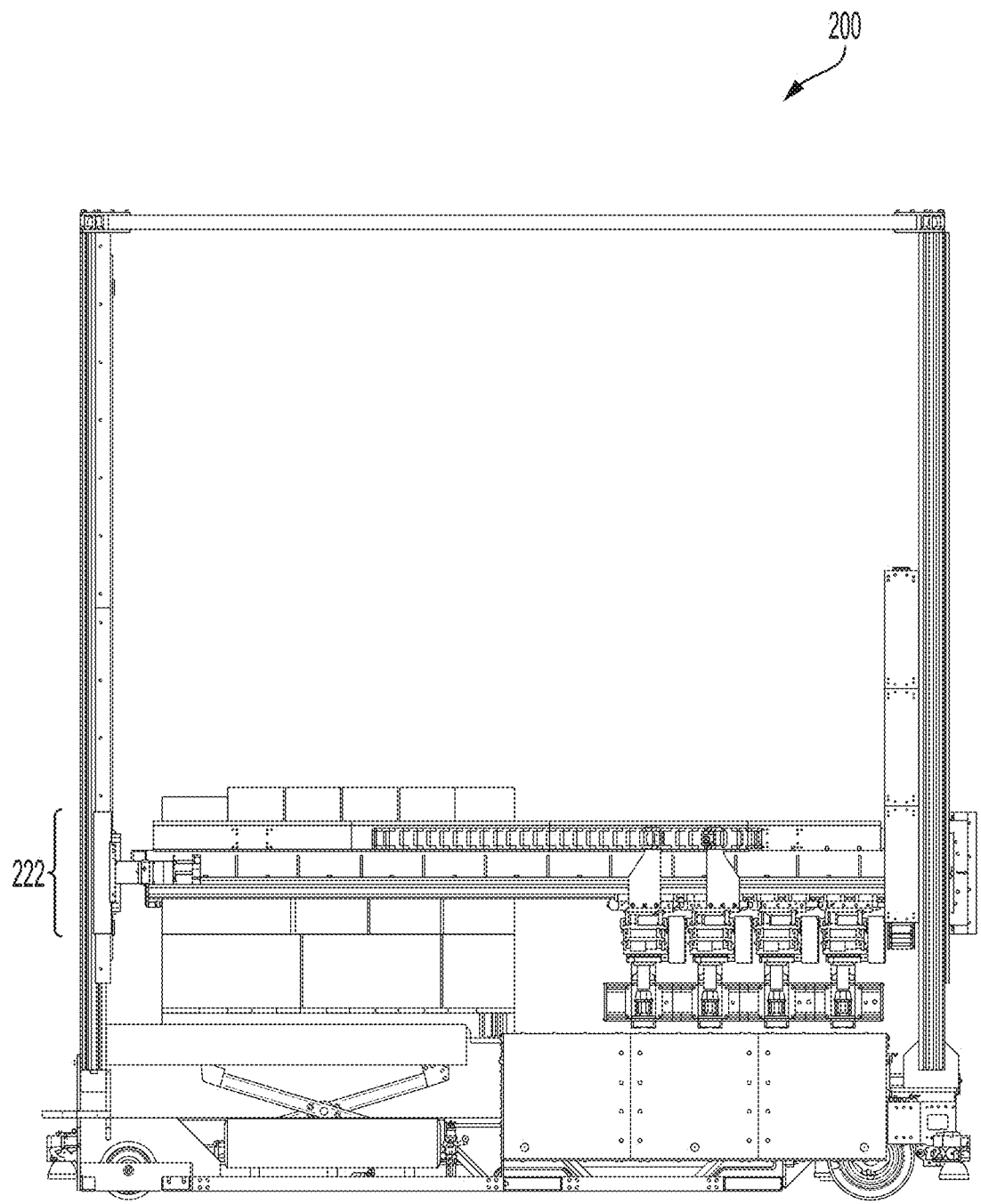

Now referring to FIG. 2A, a schematic diagram is presented, in top right perspective view, of an example robotic system 200. The example robotic system 200 may be configured to transfer items between two support surfaces (e.g., from one support surface to the other), such as from a shelf or pallet in a storage facility to a support surface in the example robotic system 200. FIG. 2B presents a top left perspective view of the example robotic system 200 of FIG.

2A, and FIGS. 2C-2G present, respectively, front side, rear side, left side, right side, top, and bottom views of the example robotic system 200 of FIG. 2A. The example robotic system 200 may be analogous to the robotic system 102 described in relation to FIG. 1.

The example robotic system 200 includes a base 202 that is configured to contact a ground surface and includes a pallet handling unit 204. The pallet handling unit 204 is configured to hold a pallet 206 with a pallet storage surface 208 parallel to the ground surface. In some variations, the base 202 includes three or more wheels 210 configured to support the example robotic system 200 as it travels along the ground surface. The three or more wheels 210 may include a steerable wheel 210a that can turn the example robotic system 200 to the left or right as it travels along the ground surface. The three or more wheels 210 may also include non-steerable wheels 210b. In some variations, the base 202 includes at least one motorized wheel (e.g., wheel 210a) that is configured to move the robotic system 200 along the ground surface. The base 202 may also include a power source (e.g., a mobile power source) electrically coupled to the at least one motorized wheel. The power source may, for example, be a rechargeable battery pack.

The example robotic system 200 also includes a vertical frame 212 that is supported by the base 202 and includes four vertical beams 214 that each extend from the base 202. The four vertical beams 214 defining respective vertical edges of an interior rectangular volume 216 of the vertical frame 212. In the example shown, the interior rectangular volume 216 has a generally rectangular cross section in each direction, and the interior rectangular volume 216 can be represented in three-dimensions by a rectangular (e.g., Cartesian) coordinate grid. The interior rectangular volume 216 may include a storage region 218 above the pallet handling unit 204 and a picking region 220 beside the storage region 218. Dashed lines in FIGS. 2A-2H show example extents for the storage and picking regions 218, 220. However, other extents are possible in the interior rectangular volume 216. In certain cases, the storage and picking regions 218, 220 may overlap.

Figure 2J:
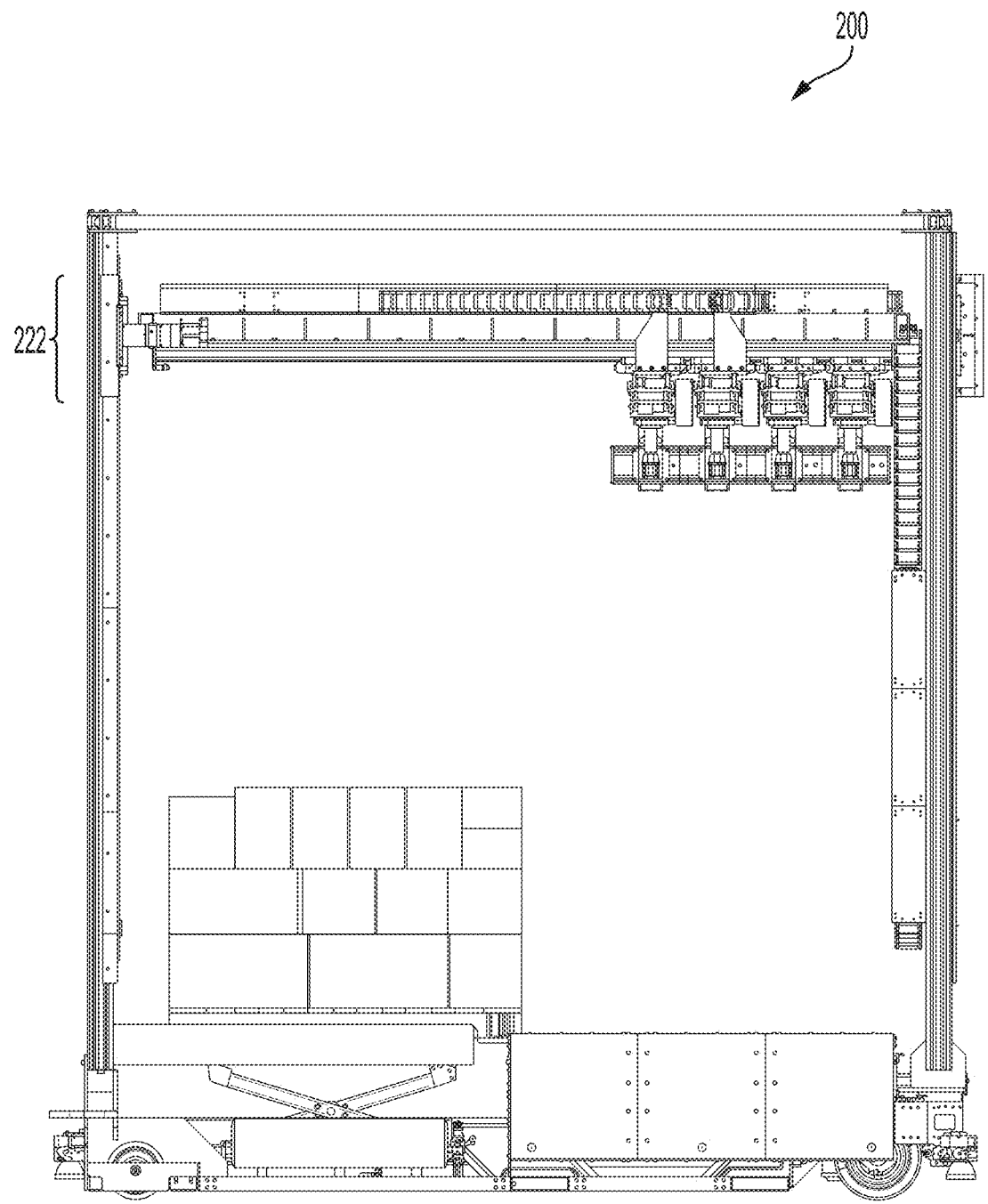
FIG. 2J is a schematic diagram, in left side view, of the example robotic system of FIG. 2A, but in which a gantry of the example robotic operating system is in a raised vertical position.

The example robotic system 200 additionally includes a gantry 222 supported by the vertical frame 212. The gantry 222 has a gantry frame 224 that is movably coupled to the four vertical beams 214. Moreover, the gantry 222 is configured to translate vertically along the four vertical beams 214. FIG. 2I presents a schematic diagram, in left side view, of the example robotic system 200 of FIG. 2A, but in which the gantry 222 is in a lowered vertical position. FIG. 2J depicts the gantry 222 in a raised vertical position. For clarity, some reference numerals and leaders have been omitted from FIGS. 2I-2J. The gantry is also configured to translate an extendable arm 226 of the example robotic system 200 horizontally along the gantry frame 224 in a first direction 228 between the storage region 218 and the picking region 220. As such, the gantry 222 can move the extendable arm 226 in the first direction 228 from the storage region 218 to the picking region 220 or vice versa. In some variations, the gantry frame 224 defines a perimeter around the interior rectangular volume 216. In some variations, the gantry frame 224 includes four corner regions 224a in which each corner region is movably coupled to a distinct one of the four vertical beams 214.

The example robotic system 200 also includes the extendable arm 226, which is supported by the gantry and includes a gripping mechanism 230. The gripping mechanism 230 is configured to perform operations such as picking up an item, holding an item, releasing an item, or any combination thereof. For example, the gripping mechanism 230 may pick up, hold, and release an item as part of transferring the item from outside the interior rectangular volume 216 into the picking region 220 and then into the storage region 218. The griping mechanism can grip an item, for instance, using a mechanical grip (e.g., a hand, a caliper, or the like), a magnetic grip, a vacuum grip, a pneumatic grip, or another type of grip. In FIGS. 2A-2K, the example robotic system 200 has four extendable arms. However, other numbers of extendable arms 226 are possible (e.g., one, two, three, five, etc.).

Figure 2K:
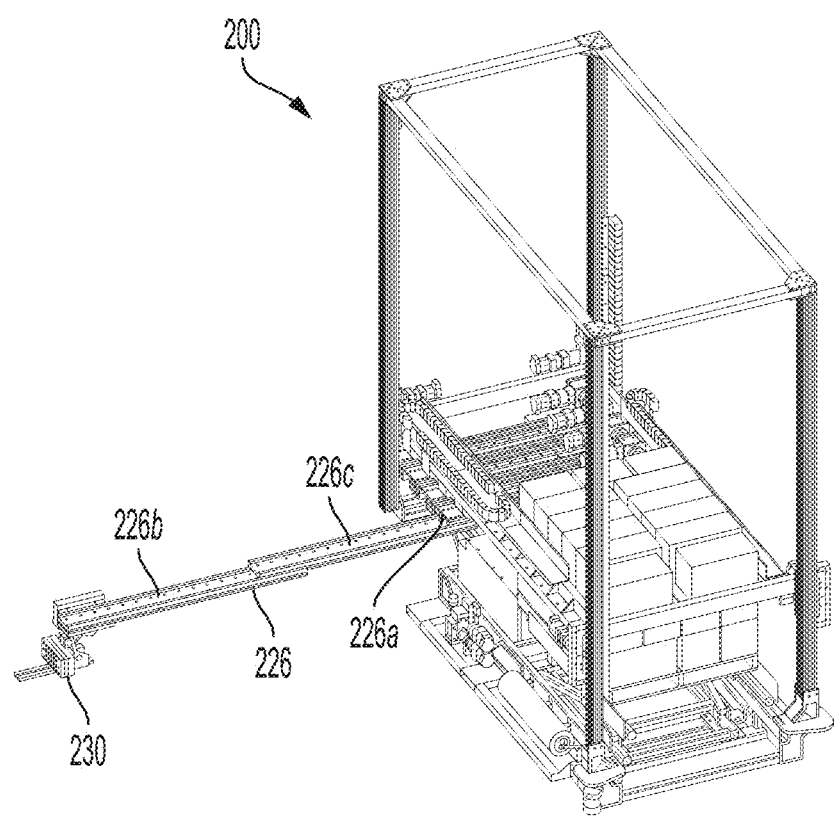
FIG. 2K is a schematic diagram, in top right perspective view, of the example robotic system of FIG. 2A, but in which an extendable arm of the example robotic system is in an extended position.

The extendable arm 226 is configured to extend and retract horizontally in a second direction 232 between an extended position and a retracted position. As such, the extendable arm 226 can extend from the retracted position to the extended position and then retract from the extended position to the retracted position. The extended position places the gripping mechanism 230 outside the interior rectangular volume 216 while the retracted position places the gripping mechanism 230 within the interior rectangular volume 216. FIG. 2K presents a schematic diagram, in top right perspective view, of the example robotic system 200 of FIG. 2A, but in which one of the extendable arms 226 is in an extended position. For clarity, some reference numerals and leaders have been omitted from FIG. 2K.

In some implementations, the extendable arm 226 is configured to extend out of two opposite sides of the example robotic system 200. For example, the example robotic system 200 may have first and second sides that are opposite each other along the second direction 232. The extendable arm 226 may then have a first extended position on the first side of the example robotic system 200 and a second extend position on the second side of the example robotic system 200. In these cases, the extendable arm 226 is configured to extend and retract horizontally in the second direction 232 between the first extended position and the retracted position as well as between the retracted position and the second extended position.

As shown in FIGS. 2A-2K, the second direction 232 and the first direction 228 are both parallel to the ground surface (and perpendicular to the vertical direction), and the second direction 232 is perpendicular to the first direction 228. Accordingly, the first direction 228, the second direction 232 and the vertical direction are mutually orthogonal and can define a rectangular (e.g., Cartesian) coordinate system with independent X, Y and Z coordinates in the interior rectangular volume 216.

In some implementations, the example robotic system 200 may include a plurality of extendable arms 226 supported by the gantry, as shown in FIGS. 2A-2K. In these implementations, each extendable arm 226 may include a respective gripping mechanism 230. Moreover, each extendable arm 226 may be configured to independently extend and retract horizontally in the second direction 232 between respective pairs of extended and retracted positions. As such, each extendable arm 226 can independently extend and retract horizontally in the second direction 232 between its own extended and retracted positions. In some variations, the storage region 218 has a horizontal cross section that is larger than a horizontal cross section of the pallet 206, and as shown in FIGS. 2A-2K, the gantry 222 includes at least one configuration in which all extendable arms 226 reside inside the picking region 220 and outside the storage region 218.

The extendable arm 226 may, in certain cases, correspond to an adjustable length railing that includes one or more railing members. For example, the extendable arm 226 may include a first railing member 226a that resides within the interior rectangular volume 216 of the vertical frame 212 when the extendable arm 226 is in the extended position. The extendable arm 226 may also include a second railing member 226b that resides outside the interior rectangular volume 216 of the vertical frame 212 when the extendable arm 226 is in the extended position. A third railing member 226c connects the first and second railing members 226a, 226b to each other and resides therebetween. The third railing member 226c may be configured to translate relative to the first railing member 226a, and the second railing member 226b may be configured to translate relative to the third railing member 226c. Selective translations of the second and third railing members 226b, 226c may allow the extendable arm 226 to extend and retract between the extended and retracted positions, thereby achieving a target length.

In some implementations, such as shown in FIGS. 2A-2K, the railing members 226 may aggregate into a stacked configuration when the extendable arm 226 is in the retracted position. The stacked configuration may be defined by a vertical sequence of the railing members 226 in which the first railing member 226a is closest to the gantry frame 224, the second railing member 226b is farthest from the gantry frame, and third railing member 226c is sandwiched in between. In these implementations, the gripping mechanism 230 may be movably coupled to the second railing member 226b and configured to translate along the second railing member 226b in the second direction 232 while remaining in the interior rectangular region 216. As such, the gripping mechanism 230 can move throughout the interior rectangular region 216 with the further assistance of the gantry 222 and its vertical motion and the extendable arm 226 and its motion along the gantry frame 224. The gripping mechanism 230 may thus allow items to be moved within the interior rectangular region 216 without mechanical components of the example robotic system 200 extending outside the interior rectangular region 216. Such capability may allow the example robotic system 200 to move items in the interior rectangular region 216 (e.g., from the picking region 220 to the storage region 218) while traveling between locations in the storage facility, thereby improving the efficiency of the example robotic system 200. This capability may also improve the safety of the example robotic system 200 when operating with human workers nearby.

In some implementations, the gripping mechanism 230 is configured to rotate about a vertical axis that is parallel to the four vertical beams 214. Such rotation may allow the gripping mechanism 230 to selectively position itself at an angular position within a 360° arc about the vertical axis. For example, the gripping mechanism 230 may be able to rotate 90° about the vertical axis, thereby changing its orientation from being aligned with the second direction 232 to being aligned with the first direction 228 (or vice versa). Other angular translations are possible. Moreover, other rotational axes are possible. In some implementations, the gripping mechanism 230 is configured to selectively tilt about a horizontal axis that is parallel to the first direction 228. In some implementations, the gripping mechanism 230 is configured to selectively roll about a horizontal axis that is parallel to the second direction 232. Such rotational capability of the gripping mechanism 230 may allow the gripping mechanism 230 to better adapt to different item or case orientations on a support surface.

In some implementations, the pallet handing unit 204 is configured to selectively move the pallet 206 between an exterior pallet position, where the pallet 206 resides exterior to the example robotic system 200, and an interior pallet position, where the pallet 206 is held in the interior rectangular volume 216 with its pallet storage surface 208 parallel to the ground surface. FIGS. 2A-2K depict the pallet 206 in the interior pallet position. In some variations, the pallet handing unit 204 may be configured to translate the pallet 206 along a vertical direction that is parallel to the four vertical beams 214. For example, the pallet handing unit 204 may include an actuated jack mechanism (e.g., a motorized scissor jack) to raise and lower the pallet 206 within the interior volume 216. Such motion may be used to position the pallet 206 at a target height for receiving items from the extendable arm 226.

In some implementations, the example robotic system 200 includes a control unit. The control unit may reside in a housing of the base 202 and include one or more processors, one or more memories, one or more communication interfaces, and possibly other components. In many variations, the control unit is configured to generate control signals for actuators (e.g., motors) of the example robotic system 200. For example, the gantry 222 may include four Z-actuators that translate the gantry 222 vertically along the four vertical beams 214 in response to control signals from the control unit. The gantry 222 may also include an X-actuator that translates the extendable arm 226 horizontally along the gantry frame 224 in the first direction 228 in response to control signals from the control unit. As another example, the extendable arm 226 may include a Y-actuator that extends and retracts the extendable arm 226 horizontally in the second direction 232 in response to control signals from the control unit. Other actuators are possible (e.g., actuators of the pallet handling unit 204, actuators of the motorized wheel 210a, etc.). In some implementations, the example robotic system 200 includes one or more cameras in communication with the control unit and configured to generate video imagery, such as of an exterior of the example robotic system 200, the storage region 218 above the pallet handling unit 204, and so forth. In these implementations, the one or more cameras and the control unit may define or be part of a 3D vision system of the example robotic system 200.

In some implementations, the control unit may be configured to process data from a storage facility system that is external to the example robotic system 200 (e.g., a global robot controller server, a portal of an automated order collection system, etc.). The storage facility system may be in wireless communication with the control unit of robotic system 200 and be configured to transmit location data to the control unit that represents, for example, a target ground location in a storage facility. The control unit may then send control signals to the at least one motorized wheel to move the example robotic system 200 along the ground surface to the target ground location. The storage facility system may also be configured to transmit location data to the control unit that represents an item location that is adjacent to the target location. In some cases, the robotic system 200 has a camera system or another type of sensor system that can sense the item's location without the need for location data. The item location may be on a support surface of the storage facility (e.g., a shelf, a pallet on a shelf, etc.). The control unit may then send control signals to the X-, Y-, and Z-actuators to move the gripping mechanism 203 to the item location or thereabouts. Other types of data are possible for the storage facility system.

During operation of the example robotic system 200, the pallet handling unit 204 may move the pallet 206 from the exterior pallet position to the interior pallet position. The pallet 206 may be unladen and located at a pallet supply area in the storage facility. After doing so, the example robotic system 200 may transport itself to a target ground location in the storage facility. After reaching the target ground location, the example robotic system 200 may translate the gantry 222 vertically to a target height on the vertical frame 212. The target height may match the height of an item that is located on a support surface of the storage facility, such as a shelf of a stacked shelving unit or a pallet on the stacked shelving unit. The example robotic system 200 may also translate, by operation of the gantry 222, the extendable arm 226 horizontally along the gantry frame 224 in the first direction 228 to a target arm position, thereby placing extendable arm 226 in line with the item. The example robotic system 200 may additionally extend the extendable arm 226 horizontally in the second direction 232 to the extended position, thereby placing the gripping mechanism 230 at the location of the item (or thereabouts) and possibly in contact with the item. The gripping mechanism 230 may then grip the item to remove the item from the support surface of the storage facility.

These operations may be reversed to place the item on the pallet support surface 208 of the pallet 206. For example, the extendable arm 226 may be retracted horizontally in the second direction 232 to the retracted position and then translated horizontally along the gantry frame 224 to a target arm position in the storage region 218. After this operation, the gantry 222 may be translated vertically to a second target height on the vertical frame 212 that defines a predetermined distance over the pallet support surface 208. The gripping mechanism 230 may subsequently release the item onto a target item position on the pallet storage surface 208. The example robotic system 200 may then move along the ground surface to a new target ground location. The new target ground location may, in some instances, correspond to a new item to be "picked and placed" onto the pallet storage surface 208. However, in other instances, the new target ground location may correspond to a drop off location for the pallet 206. In these other instances, the pallet 206 may be laden with all desired items. As such, the example robotic system 200 may unload the pallet 206. For example, the example robotic system 200 may move, by operation of the pallet handling unit 204, the pallet 206 from the interior pallet position to the exterior pallet position. In some implementations, such operation allows the example robotic system 200 to operate as part of an order fulfillment system of the storage facility.

Commerce systems are an effective means to coordinate the efforts of multiple parties to exchange goods and services for other goods or services, currency, commodities, or the like. Commerce systems may include order fulfillment systems where organizations produce or develop products or services of one type or another that are delivered to customers. For example, when product orders are received, each item that is part of the order may be retrieved from its individual storage location within a storage facility (e.g., a warehouse) and packaged together for delivery. In certain cases, this process is accomplished by workers who navigate the spaces between shelves to locate the items and place them on a pallet. However, automated systems can be adapted to collect the items of an order, and such systems can transform the storage facility such that autonomous robotic vehicles can locate the items in the storage spaces.

The efficiency of order fulfillment systems, however, can be limited by the work capacity of their human workers. For example, human workers may operate at certain levels of performance that are very difficult to exceed, and these levels may fail to meet order fulfillment demands during peak business seasons (e.g., near the end of the year or holidays). To resolve this deficiency, more workers are often hired, and while this resolution allows for an increase in the total number of orders fulfilled, it also creates more traffic in the warehouse and an overall lower efficiency for the completion of each order.

However, if a storage facility is modified to automate the order fulfillment process, its expanse can no longer be readily navigated by human workers. Thus, if the automated system in the storage facility malfunctions, human workers may be unable to fulfill the existing and incoming orders. As such, although great strides have been made in the area of order fulfillment systems, shortcomings remain.

The robotic systems described herein overcome one or more of the above-discussed problems commonly associated with conventional commerce and order fulfillment systems. Specifically, the robotic systems can allow orders to be both manually and automatically filled in the same storage facility so that the volume of orders fulfilled is adjustable to meet demands. These and other unique features of the robotic systems are discussed below.

Figure 3:
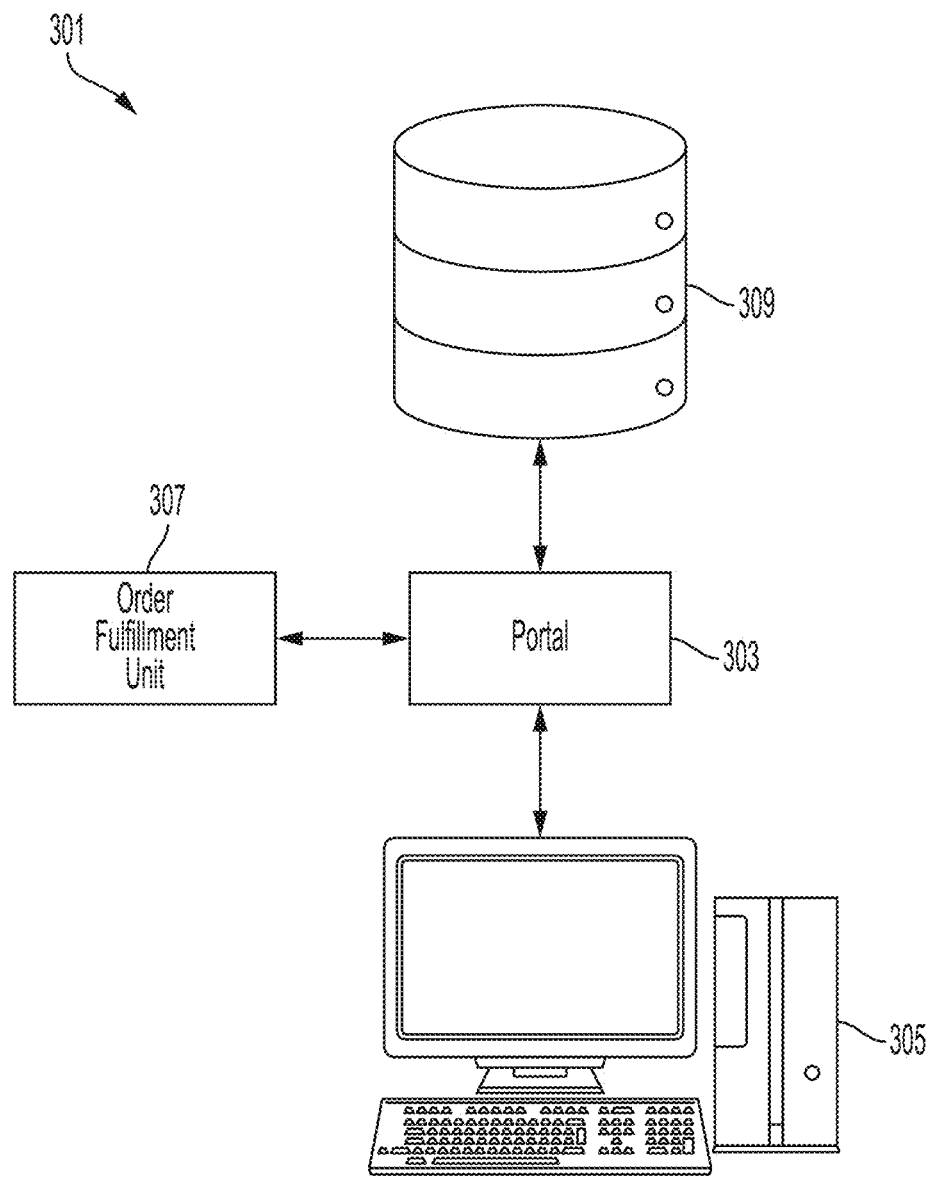
FIG. 3 is a schematic diagram of an example automated order collection system that includes an order fulfillment device and a portal.

Referring now to FIGS. 3-6 in which like reference characters identify corresponding or similar elements throughout the several views, FIG. 3 presents a schematic diagram of an example automated order collection system 301 that includes an order fulfillment device 307 and a portal 303. The example automated order collection system 301 overcomes one or more of the above-listed problems described in relation to order fulfillment systems.

The portal 303 communicates with an ERP system and the order fulfillment device 307. The portal 303 may be activated and accessed by a computing device 305. The portal 303 may also be in electronic communication with a database 309. In some variations, the order fulfillment device 307 receives instructions from the portal 303 that allows the order fulfillment device 307 to move about, identify items, and collect them in a storage facility, such as warehouse environment. The database 309 may be housed on a single computing device, or alternatively, shared over many computing devices.

Figure 4:
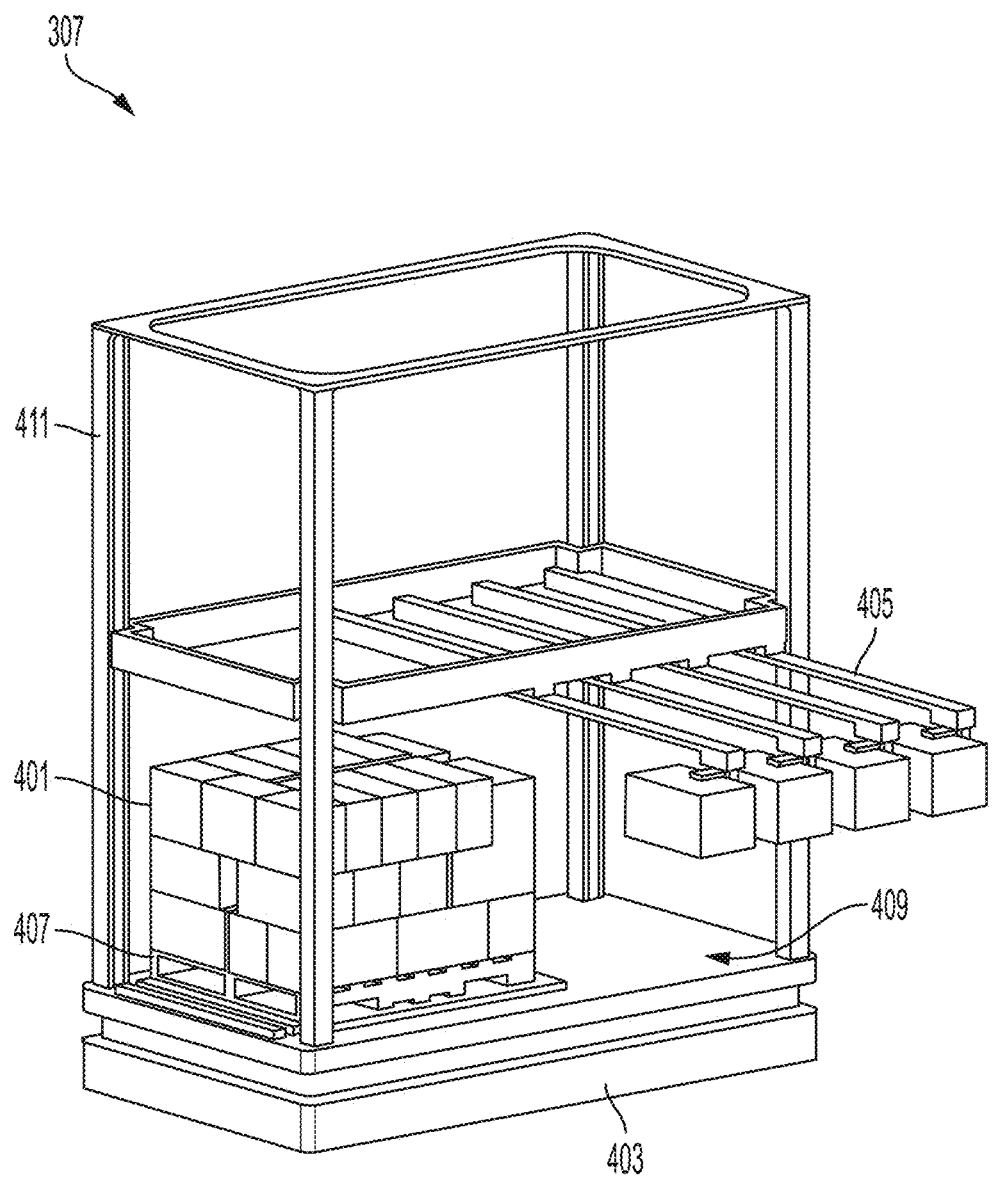
FIG. 4 is a schematic diagram, in front perspective view, of the order fulfillment device of FIG. 3.

FIG. 4 presents a schematic diagram, in front perspective view, of an example of the order fulfillment device 307 of FIG. 3. The example may be analogous to the example robotic system 200 described in relation to FIGS. 2A-2K. The order fulfillment device 307 includes an autonomous platform 403 that has robotic grippers 405 suspended on a frame 411 that is attached to a top surface 409 of the autonomous platform 403. The autonomous platform 403 and its top surface 409 may define or be part of a base of the order fulfillment device 307. The autonomous platform 403 has movement capabilities that could be accomplished by tires, treads, tracks, or the like. Moreover, the order fulfillment device 307 may include sensors to determine a position of the autonomous platform 403 within the storage facility and allow the autonomous platform 403 to negotiate the same. The robotic grippers 405 may be part of a gripping mechanism and may be configured to extend outward toward a support surface, such as defined by a shelf or pallet, and move in multiple directions to locate and grip items 401 on the support surface. During operation, the robotic grippers 405 retrieve the items 401 and stack them onto a pallet 407. In some variations, the robotic grippers 405 are a part of respective extendable arms. In these variations, the extendable arms may be coupled to a gantry that translates the extendable arms to traverse the beams and then position the robotic grippers 405 to grab the items 401. Sensors, cameras, and the like assist may assist the robotic grippers 405 while they locate items 401, retrieve them, and transfer them to autonomous platform 403 and pallet 407.

Figure 5:
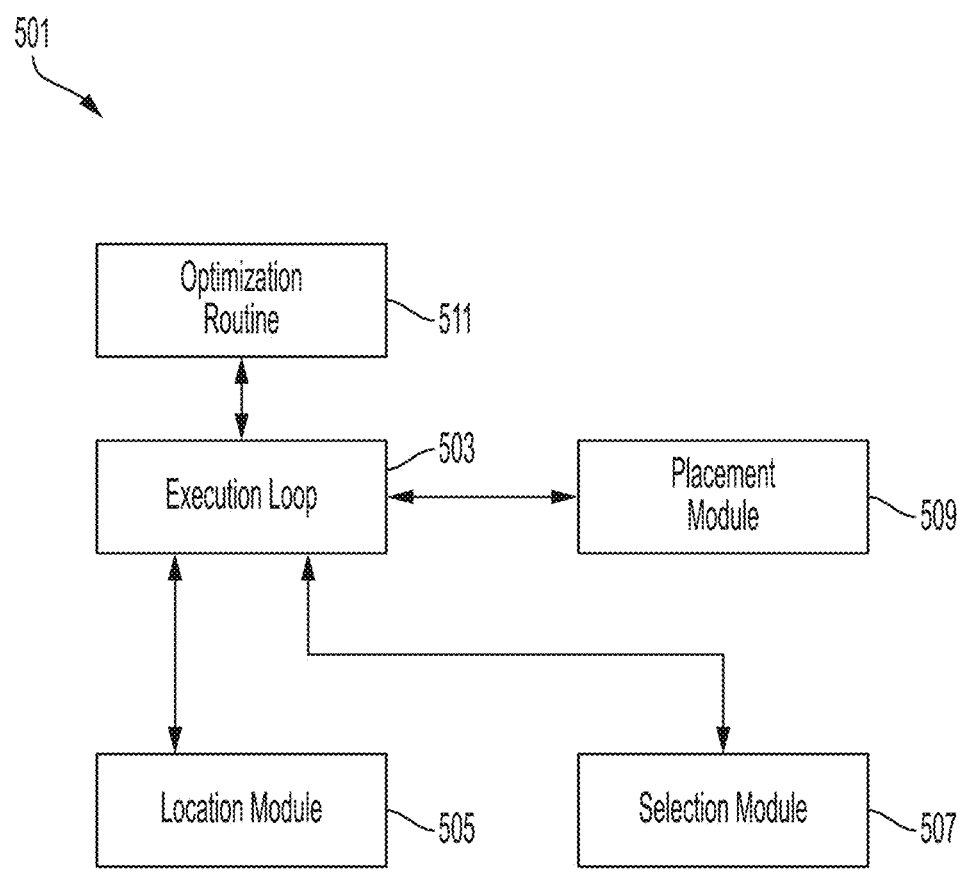
FIG. 5 is a schematic diagram of an example order module within the portal of FIG. 3.

Now referring back to FIG. 3, portal 303 is configured to accept orders for fulfillment from many sources such as the ERP system. Portal 303 could have multiple instances therein, and one of these contemplated instances may be an order module. FIG. 5 presents a schematic diagram of an example order module 501 within the portal 303 of FIG. 3. The example order module 501 includes an execution loop 503 that issues commands to the autonomous platform 403 and the robotic arm 405 of the order fulfillment device 307 to navigate the storage facility, locate items 401, and any other action taken thereby. In some variations, the order module 501 also includes a location module 505, a selection module 507, and a placement module 509. An optimization routine 511 evaluates the performance of the execution loop 503 and implements improvements thereto. The location module 505 may provide instructions to autonomous platform 403 to navigate the storage facility, such as to move between obstacles like shelves, navigate to target items, and the like. The selection module 507 provides instructions to the robotic arm 405 on which target items to grab and place on the autonomous platform 403 (e.g., place on a pallet held in the autonomous platform 403). The placement module 509 provides instructions on where to place the target items that have been grabbed. For example, the target items may be organized for shipment when placed. The target items may also be arranged to maximize the number of items that are on the autonomous platform 403. In certain cases, the target items are arranged to improve the safety of the target items when placed.

Figure 6:
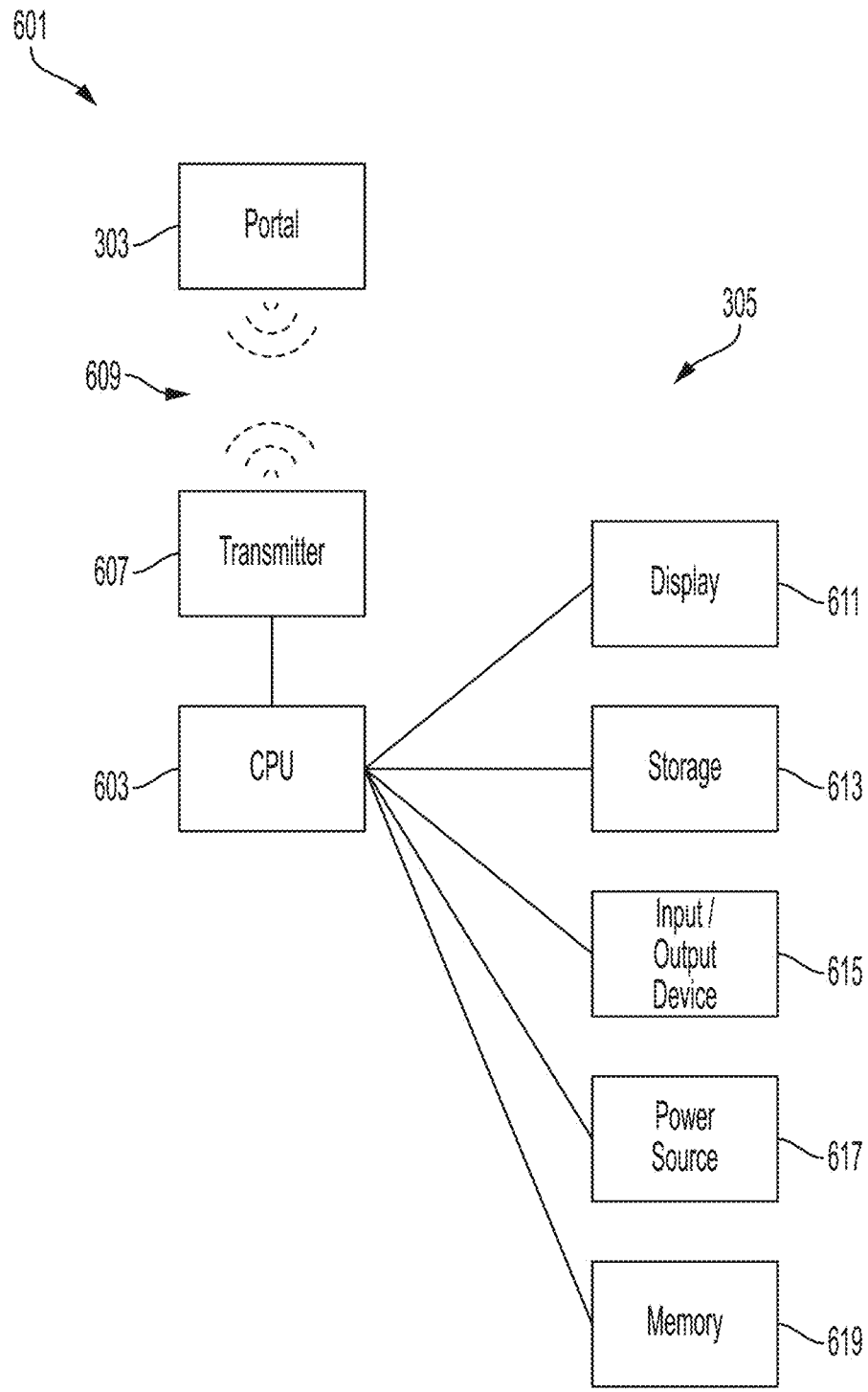
FIG. 6 is a schematic diagram of an example digital environment of the example automated order collection system of FIG. 3.

Referring now to FIG. 6, a schematic diagram is presented of an example digital environment of the example automated order collection system 301 of FIG. 3. In this example, the portal 303 may operate in an electronic environment that includes the computing device 305. The computing device 305 may include components such as a CPU 603 that issues commands and receives information from other components such as a display 611, a storage device 613, input/output devices 615, a power source 617, and a memory 619. A transmitter 607 allows the computing device 305 to communicate with other computing devices and the portal 303 via a network 609. The commands sent by the CPU 603 may be in machine language and the instructions thereof may be in binary form.

In use, a set of items to collect is received from the ERP system in the portal 303. The portal 303 sends instructions to the order fulfillment device 307 to collect target items from shelves or pallets of the storage facility. The order fulfillment device 307 navigates to the target items and the robotic grippers 405 extend outward to grab the target items and place them on the pallet 407 on the autonomous platform 403. When all items to be collected have been located and placed on the pallet 407, the order fulfillment device 307 returns, and the items 401 are delivered or shipped to the purchaser.

In some cases, the autonomous platform 403 navigates a storage facility such that human workers and the order fulfillment device 307 can work in the same storage facility to fulfill orders.

In some aspects of what is described, a robotic system may be described by the following examples. The robotic system may be used to transfer items between two support surfaces, such as between a pallet or shelf in a storage facility and a pallet held by the robotic system.

Example 1. A robotic system comprising:
  a base configured to contact a ground surface and comprising a pallet handling unit, the pallet handling unit configured to hold a pallet with a pallet storage surface parallel to the ground surface;
  a vertical frame supported by the base and comprising four vertical beams that each extend from the base, the four vertical beams defining respective vertical edges of an interior rectangular volume of the vertical frame, the interior rectangular volume comprising:
    a storage region above the pallet handling unit, and
    a picking region beside the storage region;
  a gantry supported by the vertical frame and comprising a gantry frame that is movably coupled to the four vertical beams, the gantry configured to:
    translate vertically along the four vertical beams, and
    translate an extendable arm of the robotic system horizontally along the gantry frame in a first direction between the storage region and the picking region; and
  the extendable arm, supported by the gantry and comprising a gripping mechanism, the extendable arm configured to extend and retract horizontally in a second direction between an extended position and a retracted position, wherein:
    the second direction is perpendicular to the first direction,
    the extended position places the gripping mechanism outside the interior rectangular volume, and
    the retracted position places the gripping mechanism within the interior rectangular volume.

Example 2. The robotic system of example 1, comprising:
  a plurality of extendable arms supported by the gantry, each extendable arm comprising a respective gripping mechanism and configured to independently extend and retract horizontally in the second direction between respective pairs of extended and retracted positions;
    wherein the gantry is configured to independently translate each of the plurality extendable arms horizontally along the gantry frame in the first direction.

Example 3. The robotic system of example 2,
  wherein the storage region has a horizontal cross section that is larger than a horizontal cross section of the pallet, and
  wherein the gantry comprises at least one configuration in which all extendable arms reside inside the picking region and outside the storage region.

Example 4. The robotic system of example 1 or any one of examples 2-3, wherein the gantry frame comprises four corner regions in which each corner region is movably coupled to a distinct one of the four vertical beams.

Example 5. The robotic system of example 1 or any one of examples 2-4, comprising:
  a control unit;
  wherein the gantry comprises:
    four Z-actuators that translate the gantry vertically along the four vertical beams in response to control signals from the control unit,
    an X-actuator that translates the extendable arm horizontally along the gantry frame in the first direction in response to control signals from the control unit; and wherein the extendable arm comprises a Y-actuator that extends and retracts the extendable arm horizontally in the second direction in response to control signals from the control unit.

Example 6. The robotic system of example 5, comprising a camera in communication with the control unit and configured to generate video imagery of an exterior of the robotic system.

Example 7. The robotic system of example 1 or any one of examples 2-6, wherein the extendable arm comprises:
a first railing member that resides within the interior rectangular volume of the vertical frame when the extendable arm is in the extended position;
a second railing member that resides outside the interior rectangular volume of the vertical frame when the extendable arm is in the extended position; and
a third railing member that connects the first and second railing members to each other and resides therebetween.

Example 8. The robotic system of example 1 or any one of examples 2-7, wherein the base comprises:
at least one motorized wheel configured to move the robotic system along the ground surface; and
a power source electrically coupled to the at least one motorized wheel.

Example 9. The robotic system of example 1 or any one of examples 2-8, wherein the pallet handing unit is configured to selectively move the pallet between an exterior pallet position, where the pallet resides exterior to the robotic system, and an interior pallet position, where the pallet is held in the interior rectangular volume with its pallet storage surface parallel to the ground surface.

In some aspects of what is described, a method may be described by the following examples. The method may be used to transfer items between two support surfaces, such as between a pallet or shelf in a storage facility and a pallet held by a robotic system.

Example 10. A method comprising:
translating a gantry vertically to a target height on a vertical frame of a robotic system, the robotic system comprising:
a base that contacts a ground surface and comprises a pallet handling unit, the pallet handling unit supporting a pallet with a pallet storage surface that is parallel to the ground surface,
the vertical frame, supported by the base and comprising four vertical beams that each extend from the base and define respective vertical edges of an interior rectangular volume of the vertical frame, the interior rectangular volume comprising:
a storage region above the pallet handling unit, and
a picking region beside the storage region,
the gantry, supported by the vertical frame, and
an extendable arm supported by the gantry;
translating, by operation of the gantry, the extendable arm horizontally along the gantry frame to a target arm position, the extendable arm translating in a first direction between the storage region and the picking region; and
extending or retracting the extendable arm horizontally in a second direction between an extended position and a retracted position, the extendable arm comprising a gripping mechanism, wherein:
the second direction is perpendicular to the first direction,
the extended position places the gripping mechanism outside the interior rectangular volume, and
the retracted position places the gripping mechanism within the interior rectangular volume.

Example 11. The method of example 10, comprising:
moving, by operation of the pallet handling unit, a pallet from an exterior pallet position, where the pallet resides exterior to the robotic system, to an interior pallet position, where the pallet is held by the pallet handling unit in the interior rectangular volume and with its pallet storage surface parallel to the ground surface.

Example 12. The method of example 11,
wherein translating the extendable arm comprises translating the extendable arm horizontally along the gantry frame to a target arm position in the picking region;
wherein extending or retracting the extendable arm comprises extending the extendable arm horizontally in the second direction to the extended position; and
wherein the method comprises gripping, by operation of the gripping mechanism, an item that resides on a support surface that is outside of the interior rectangular volume.

Example 13. The method of example 11 or example 12,
wherein extending or retracting the extendable arm comprises retracting the extendable arm horizontally in the second direction to the retracted position;
wherein translating the extendable arm comprises translating the extendable arm horizontally along the gantry frame to a target arm position in the storage region; and
wherein the method comprises releasing, by operation of the gripping mechanism, an item onto a target item position on the pallet storage surface.

Example 14. The method of example 10 or any one of examples 11-13,
wherein the robotic system comprises a plurality of extendable arms supported by the gantry, each extendable arm comprising a respective gripping mechanism and configured to independently extend and retract horizontally in the second direction between respective pairs of extended and retracted positions; and
wherein the method comprises:
by operation of the gantry, independently translating each of the plurality extendable arms horizontally along the gantry frame in the first direction.

Example 15. The method of example 14,
wherein the storage region has a horizontal cross section that is larger than a horizontal cross section of the pallet, and
wherein the method comprises moving all extendable arms inside the picking region and outside the storage region.

Example 16. The method of example 10 or any one of examples 11-15, wherein the gantry frame comprises four corner regions in which each corner region is movably coupled to a distinct one of the four vertical beams.

Example 17. The method of example 10 or any one of examples 11-16,
wherein the robotic system comprises a control unit;
wherein translating the gantry comprises translating, by operation of four Z-actuators, the gantry vertically along the four vertical beams in response to control signals from the control unit;
wherein translating the extendable arm comprises translating, by operation an X-actuator, the extendable arm horizontally along the gantry frame in the first direction in response to control signals from the control unit; and
wherein extending or retracting the extendable arm comprises extending or retracting, by operation of a Y-actuator, the extendable arm horizontally in the second direction in response to control signals from the control unit.

Example 18. The method of example 17,
wherein the robotic system comprises a camera in communication with the control unit; and
wherein the method comprises generating, by operation of the camera, video imagery of an exterior of the robotic system.

Example 19. The method of example 10 or any one of examples 11-18, wherein the extendable arm comprises:
a first railing member that resides within the interior rectangular volume of the vertical frame when the extendable arm is in the extended position;
a second railing member that resides outside the interior rectangular volume of the vertical frame when the extendable arm is in the extended position; and
a third railing member that connects the first and second railing members to each other and resides therebetween.

Example 20. The method of example 10 or any one of examples 11-19,
wherein the base comprises a motorized wheel and a power source electrically coupled to the motorized wheel; and
wherein the method comprises moving, by operation of the motorized wheel, the robotic system along the ground surface.

In some aspects of what is described, an automated order collection system may be described by the following examples. The automated order collection system may be used to collect items in a storage facility (e.g., a warehouse) to fulfill an order, which may involve an order fulfillment device retrieving items from a pallet or shelf in the storage facility. The retrieved items may be transferred from the pallet or shelf to a support surface of the order fulfillment device (e.g., a pallet held in the order fulfillment device).

Example 21. An automated order collection system comprising:
a portal that operates in an electronic environment;
an order fulfillment device; and
a plurality of items on shelves in a warehouse;
wherein the portal provides a list of items for the order fulfillment device to collect from the shelves in the warehouse; and
wherein the order fulfillment device collects the items and presents them for delivery.

In some aspects of what is described, an order fulfillment device may be described by the following examples. The order fulfillment device may be used to retrieve items from a pallet or shelf in a storage facility (e.g., a warehouse), and the retrieved items may be transferred from the pallet or shelf to a support surface of the order fulfillment device. The support surface may, in some instances, be located on an autonomous platform of the order fulfillment device. For example, the autonomous platform may be configured to hold a pallet that serves as the support surface.

Example 22. An order fulfillment device, comprising:
an autonomous platform that moves through a warehouse without human direction; and
at least one robotic gripper that is attached to the autonomous platform;
wherein the at least one robotic gripper selects, grabs, and places items on the autonomous platform.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:
1. A robotic system comprising:
a base configured to contact a ground surface and comprising a pallet handling unit, the pallet handling unit configured to hold a pallet with a pallet storage surface parallel to the ground surface;
a vertical frame supported by the base and comprising four vertical beams that each extend from the base, the four vertical beams defining respective vertical edges of an interior rectangular volume of the vertical frame, the interior rectangular volume comprising:
a storage region above the pallet handling unit, and
a picking region beside the storage region;
a gantry supported by the vertical frame and comprising a gantry frame that is movably coupled to the four vertical beams, the gantry configured to:
translate vertically along the four vertical beams, and
translate an extendable arm of the robotic system horizontally along the gantry frame in a first direction between the storage region and the picking region; and
the extendable arm, supported by the gantry and comprising a gripping mechanism, the extendable arm configured to extend and retract horizontally in a second direction between an extended position and a retracted position, wherein:
the second direction is perpendicular to the first direction,
the extended position places the gripping mechanism outside the interior rectangular volume, and
the retracted position places the gripping mechanism within the interior rectangular volume.

2. The robotic system of claim 1, comprising:
a plurality of extendable arms supported by the gantry, each extendible arm comprising a respective gripping mechanism and configured to independently extend and retract horizontally in the second direction between respective pairs of extended and retracted positions;
wherein the gantry is configured to independently translate each of the plurality extendable arms horizontally along the gantry frame in the first direction.

3. The robotic system of claim 2,
wherein the storage region has a horizontal cross section that is larger than a horizontal cross section of the pallet, and
wherein the gantry comprises at least one configuration in which all extendable arms reside inside the picking region and outside the storage region.

4. The robotic system of claim 1, wherein the gantry frame comprises four corner regions in which each corner region is movably coupled to a distinct one of the four vertical beams.

5. The robotic system of claim 1, comprising:
a control unit;
wherein the gantry comprises:
four Z-actuators that translate the gantry vertically along the four vertical beams in response to control signals from the control unit,
an X-actuator that translates the extendable arm horizontally along the gantry frame in the first direction in response to control signals from the control unit; and
wherein the extendable arm comprises a Y-actuator that extends and retracts the extendable arm horizontally in the second direction in response to control signals from the control unit.

6. The robotic system of claim 5, comprising a camera in communication with the control unit and configured to generate video imagery of an exterior of the robotic system.

7. The robotic system of claim 1, wherein the extendable arm comprises:
a first railing member that resides within the interior rectangular volume of the vertical frame when the extendable arm is in the extended position;
a second railing member that resides outside the interior rectangular volume of the vertical frame when the extendable arm is in the extended position; and
a third railing member that connects the first and second railing members to each other and resides therebetween.

8. The robotic system of claim 1, wherein the base comprises:
at least one motorized wheel configured to move the robotic system along the ground surface; and
a power source electrically coupled to the at least one motorized wheel.

9. The robotic system of claim 1, wherein the pallet handing unit is configured to selectively move the pallet between an exterior pallet position, where the pallet resides exterior to the robotic system, and an interior pallet position, where the pallet is held in the interior rectangular volume with its pallet storage surface parallel to the ground surface.

10. A method comprising:
translating a gantry vertically to a target height on a vertical frame of a robotic system, the robotic system comprising:
a base that contacts a ground surface and comprises a pallet handling unit, the pallet handling unit supporting a pallet with a pallet storage surface that is parallel to the ground surface,
the vertical frame, supported by the base and comprising four vertical beams that each extend from the base and define respective vertical edges of an interior rectangular volume of the vertical frame, the interior rectangular volume comprising:
a storage region above the pallet handling unit, and
a picking region beside the storage region,
the gantry, supported by the vertical frame and comprising a gantry frame that is movably coupled to the four vertical beams, and
an extendable arm supported by the gantry;
translating, by operation of the gantry, the extendable arm horizontally along the gantry frame to a target arm position, the extendable arm translating in a first direction between the storage region and the picking region; and
extending or retracting the extendable arm horizontally in a second direction between an extended position and a retracted position, the extendable arm comprising a gripping mechanism, wherein:
the second direction is perpendicular to the first direction,
the extended position places the gripping mechanism outside the interior rectangular volume, and
the retracted position places the gripping mechanism within the interior rectangular volume.

11. The method of claim 10, comprising:
moving, by operation of the pallet handling unit, a pallet from an exterior pallet position, where the pallet resides exterior to the robotic system, to an interior pallet position, where the pallet is held by the pallet handling unit in the interior rectangular volume and with its pallet storage surface parallel to the ground surface.

12. The method of claim 11,
wherein translating the extendable arm comprises translating the extendable arm horizontally along the gantry frame to a target arm position in the picking region;
wherein extending or retracting the extendable arm comprises extending the extendable arm horizontally in the second direction to the extended position; and
wherein the method comprises gripping, by operation of the gripping mechanism, an item that resides on a support surface that is outside of the interior rectangular volume.

13. The method of claim 11,
wherein extending or retracting the extendable arm comprises retracting the extendable arm horizontally in the second direction to the retracted position;
wherein translating the extendable arm comprises translating the extendable arm horizontally along the gantry frame to a target arm position in the storage region; and
wherein the method comprises releasing, by operation of the gripping mechanism, an item onto a target item position on the pallet storage surface.

14. The method of claim 10,
wherein the robotic system comprises a plurality of extendable arms supported by the gantry, each extendable arm comprising a respective gripping mechanism and configured to independently extend and retract horizontally in the second direction between respective pairs of extended and retracted positions; and
wherein the method comprises:
by operation of the gantry, independently translating each of the plurality extendable arms horizontally along the gantry frame in the first direction.

15. The method of claim 14,
wherein the storage region has a horizontal cross section that is larger than a horizontal cross section of the pallet, and
wherein the method comprises moving all extendable arms inside the picking region and outside the storage region.

16. The method of claim 10, wherein the gantry frame comprises four corner regions in which each corner region is movably coupled to a distinct one of the four vertical beams.

17. The method of claim 10,
wherein the robotic system comprises a control unit;
wherein translating the gantry comprises translating, by operation of four Z-actuators, the gantry vertically along the four vertical beams in response to control signals from the control unit;
wherein translating the extendable arm comprises translating, by operation an X-actuator, the extendable arm horizontally along the gantry frame in the first direction in response to control signals from the control unit; and
wherein extending or retracting the extendable arm comprises extending or retracting, by operation of a Y-actuator, the extendable arm horizontally in the second direction in response to control signals from the control unit.

18. The method of claim 17,
wherein the robotic system comprises a camera in communication with the control unit; and
wherein the method comprises generating, by operation of the camera, video imagery of an exterior of the robotic system.

19. The method of claim 10, wherein the extendable arm comprises:
a first railing member that resides within the interior rectangular volume of the vertical frame when the extendable arm is in the extended position;
a second railing member that resides outside the interior rectangular volume of the vertical frame when the extendable arm is in the extended position; and
a third railing member that connects the first and second railing members to each other and resides therebetween.

20. The method of claim 10,
wherein the base comprises a motorized wheel and a power source electrically coupled to the motorized wheel; and
wherein the method comprises moving, by operation of the motorized wheel, the robotic system along the ground surface.

* * * * *